US007826629B2

(12) United States Patent
Miles et al.

(10) Patent No.: US 7,826,629 B2
(45) Date of Patent: Nov. 2, 2010

(54) OPTICAL SENSING IN A DIRECTIONAL MEMS MICROPHONE

(75) Inventors: Ronald N. Miles, Newark Valley, NY (US); F. Levent Degertekin, Decatur, GA (US)

(73) Assignee: State University New York, Binghamton, NY (US)

( * ) Notice: Subject to any disclaimer, the term of this patent is extended or adjusted under 35 U.S.C. 154(b) by 1310 days.

(21) Appl. No.: 11/335,137

(22) Filed: Jan. 19, 2006

(65) Prior Publication Data

US 2007/0165896 A1 Jul. 19, 2007

(51) Int. Cl.

*H04R 25/00* (2006.01)
*G01H 1/00* (2006.01)
*G01D 5/36* (2006.01)
*G01B 11/02* (2006.01)

(52) U.S. Cl. .................... 381/172; 73/655; 250/237 G; 356/498

(58) Field of Classification Search ................ 381/172; 73/655; 250/237; 356/496–498
See application file for complete search history.

(56) References Cited

U.S. PATENT DOCUMENTS 5,311,360 A * 5/1994 Bloom et al. ............... 359/572
6,567,572 B2 5/2003 Degertekin et al.
6,788,796 B1 9/2004 Miles
7,355,720 B1 * 4/2008 Carr ........................... 356/498
2002/0039463 A1 * 4/2002 Degertekin et al. ........... 385/12
2002/0118850 A1 * 8/2002 Yeh et al. .................... 381/313
2003/0002129 A1 * 1/2003 Kobayashi et al. .......... 359/285
2004/0130728 A1 7/2004 Degertekin
2006/0140431 A1 * 6/2006 Zurek ......................... 381/355
2007/0297631 A1 12/2007 Miles

OTHER PUBLICATIONS

U.S. Appl. No. 10/689,189, Miles.

Cui, W. et al., "Optical Sensing in a Directional MEMS Microphone Inspired by the Ears of the Parasitoid Fly, *Ormia ochracea*", Jan. 2006.

Lee and F.L. Degertekin, "Rigorous Coupled-wave Analysis of Multilayered Grating Structures," IEEE Journal of Lightwave Technology, 22, pp. 2359-2363, 2004.

Hall N. and Degertekin F.L., "An Integrated Optical Detection Method for Capacitive Micromachined Ultrasonic Transducers," Proceedings of 2000 IEEE Ultrasonics Symposium, pp. 951-954, 2000.

Hall N.A. and Degertekin F.L., "An Integrated Optical Interferometric Detection Method for Micromachined Capacitive Acoustic Transducers," Appl. Phys. Lett., 80, pp. 3859-3861 2002.

* cited by examiner

*Primary Examiner*—Curtis Kuntz
*Assistant Examiner*—Jesse A Elbin
(74) *Attorney, Agent, or Firm*—Ostrolenk Faber LLP; Steven M. Hoffberg

(57) ABSTRACT

A microphone having an optical component for converting the sound-induced motion of the diaphragm into an electronic signal using a diffraction grating. The microphone with interdigitated fingers is fabricated on a silicon substrate using a combination of surface and bulk micromachining techniques. A 1 mm×2 mm microphone diaphragm, made of polysilicon, has stiffeners and hinge supports to ensure that it responds like a rigid body on flexible hinges. The diaphragm is designed to respond to pressure gradients, giving it a first order directional response to incident sound. This mechanical structure is integrated with a compact optoelectronic readout system that displays results based on optical interferometry.

22 Claims, 12 Drawing Sheets

OPTICAL SENSING IN A DIRECTIONAL MEMS MICROPHONE

This invention was made with government support under contract R01DC005762 awarded by NIH. The government has certain rights in the invention.

RELATED APPLICATIONS

The present application is related to U.S. Pat. No. 6,788,796 for DIFFERENTIAL MICROPHONE, issued Sep. 7, 2004; and copending U.S. Patent Applications, Ser. No. 10/689,189 for ROBUST DIAPHRAGM FOR AN ACOUSTIC DEVICE, filed Oct. 20, 2003, and Ser. No. 11/198,370 for COMB SENSE MICROPHONE, filed Aug. 5, 2005, all of which are incorporated herein by reference.

FIELD OF THE INVENTION

The present invention pertains to microphones and, more particularly, to micromachined differential microphones and optical interferometry to produce an electrical output signal.

BACKGROUND OF THE INVENTION

Low noise and low power are essential characteristics for hearing aid microphones. Most high performance microphones, and particularly miniature microphones, consist of a thin diaphragm along with a spaced apart, parallel back plate electrode; they use capacitive sensing to detect diaphragm motion. This permits detecting the change in capacitance between the pressure-sensitive diaphragm and the back plate electrode. In order to detect this change in capacitance, a bias voltage must first be imposed between the back plate and the diaphragm.

This voltage creates practical constraints on the mechanical design of the diaphragm that compromise its effectiveness in detecting sound. Specifically, inherent in the capacitive sensing configuration are a few limitations. First, viscous damping caused by air between the diaphragm and the back plate can have a significant negative effect on the response. Second, the signal to noise ratio is reduced by the electronic noise associated with capacitive sensing and the thermal noise associated with a passive damping. Moreover, due to the viscosity of air, a significant source of microphone self noise is introduced. Third, while the electrical sensitivity is proportional to the bias voltage, when the voltage exceeds a critical value, the attractive force causes the diaphragm to collapse against the back plate.

To illustrate the limitations imposed on the noise performance of the read-out circuitry used in a capacitive sensing scheme, consider the buffer amplifier having a white noise spectrum given by N volts/√MHz. If the effective sensitivity of the capacitive microphone is S volts/Pascal then the input-referred noise is N/S Pascals/√Hz.

In a conventional capacitive microphone, the sensitivity may be approximated by:

$$S = \frac{V_b A}{hk} \qquad (1)$$

where $V_b$ is the bias voltage, A is the area, h is the air gap between the diaphragm and the back plate, and k is the mechanical stiffness of the diaphragm.

For purposes of this discussion, assume that the resonant frequency of the diaphragm is beyond the highest frequency of interest. The input referred noise of the buffer amplifier then becomes:

$$\frac{N}{S} = \frac{Nhk}{V_b A} \text{ pascals/MHz} \qquad (2)$$

Theoretically, this noise can be reduced by increasing the bias voltage, $V_b$, or by reducing the diaphragm stiffness, k. Unfortunately, these parameters cannot be adjusted independently because the forces that are created by the biasing electric field can cause the diaphragm to collapse against the back plate. In a constant voltage (as opposed to constant charge) biasing scheme, the collapse voltage is given by:

$$V_{collapse} = \sqrt{\frac{8}{27}\frac{kh^3}{\varepsilon A_0}} \qquad (3)$$

where ϵ is the permittivity of the air in the gap. Diaphragms that have low equivalent mechanical stiffness, k, have low collapse voltages. To avoid collapse, $V_b \ll V_{collapse}$.

Equation 3 clearly shows that the collapse voltage can be increased by increasing the gap spacing, h. Increasing h, however, reduces the microphone capacitance, which is inversely proportional to the nominal gap spacing, h. Since miniature microphones, and particularly silicon microphones, have very small diaphragm areas, A, the capacitance tends to be rather small, on the order of 1 pF. The small capacitance of the microphone challenges the designer of the buffer amplifier because of parasitic capacitances and the effective noise gain of the overall circuit.

For these reasons, the gap, h, used in silicon microphones tends to be small, on the order of 5 μm. The use of a gap that is as small as 5 μm introduces yet another limitation on the performance that is imposed by capacitive sensing. As the diaphragm moves in response to fluctuating acoustic pressures, the air in the narrow gap between the diaphragm and the back plate is squeezed and forced to flow in the plane of the diaphragm. Because h is much smaller than the thickness of the viscous boundary layer (typically on the order of hundreds of μm), this flow produces viscous forces that damp the diaphragm motion. It is well known that this squeeze film damping is a primary source of thermal noise in silicon microphones.

The optical sensing approach hereinafter described is intended to be used with the microphone diaphragms described in Cui, W. et al., "Optical Sensing in a Directional MEMS Microphone Inspired by the Ears of the Parasitoid Fly, Ormia Ochracea", January, 2006. These diaphragms incorporate carefully designed hinges that control their overall compliance and sensitivity. By combining the inventive optical sensing approach with these microphone diaphragm concepts, miniature microphones can be manufactured with extremely high sensitivity and low noise. Low noise, directional miniature microphones can be fabricated with high sensitivity for hearing aid applications. Incorporation of optical sensing provides high electrical sensitivity, which, combined with the high mechanical sensitivity of the microphone membrane, results in a low minimum detectable pressure level.

Although optical interferometry has long been used for low noise mechanical measurements, the high voltage and power levels needed for lasers and the lack of integration have prohibited the application of this technique to micromachined microphones. These limitations have recently been overcome by methods and devices as described by Degertekin et al. in U.S. Pat. No. 6,567,572 for "Optical Displacement Sensor," copending U.S. patent application Ser. No. 10/704,932, filed by Degertekin et al. on Nov. 10, 2003 for "Highly-Sensitive Displacement Measuring Optical Device", and copending U.S. patent application Ser. No. 11/297,097, for "Displacement Sensor", filed by Degertekin et al. Dec. 8, 2005, all hereby incorporated by reference in their entirety.

It is, therefore, an object of the invention to provide a MEMS differential microphone having enhanced sensitivity.

It is another object of the invention to provide a MEMS differential microphone having optical means for converting sound-induced motion of the diaphragm into an electronic signal.

It is an additional object of the invention to provide a MEMS differential microphone exhibiting a first order differential response to provide a directional microphone.

It is a further object of the invention to provide a MEMS differential microphone having a silicon membrane diaphragm and protective front screen fabricated using silicon micro-fabrication techniques.

It is yet another object of the invention to provide a MEMS differential microphone having low power consumption.

It is a still further object of the invention to provide a MEMS differential microphone suitable for use in hearing aids.

It is another object of the invention to provide a MEMS differential microphone using a optical interferometer to convert sound impinging upon the microphone to an electrical output signal.

It is an additional object of the invention to provide a MEMS differential microphone wherein the optical interferometer is implemented using a miniature laser such as a vertical cavity surface emitting laser (VCSEL).

SUMMARY OF THE INVENTION

In accordance with the present invention, there is provided a microphone having optical means for converting the sound-induced motion of the microphone diaphragm into an electronic signal. A diffraction device (e.g., a diffraction grating or, in alternate embodiments, inter-digitated fingers) is integrated with the microphone diaphragm to implement an optical interferometer which has the sensitivity of a Michelson interferometer. Because of the unique construction, the bulky and heavy beam splitter normally required in a Michelson interferometer is eliminated allowing a miniature, lightweight microphone to be fabricated. The microphone has a polysilicon diaphragm formed as a silicon substrate using a combination of surface and bulk micromachining techniques. The approximately 1 mm×2 mm microphone diaphragm has stiffeners formed on a back surface thereof. The diaphragm rotates or "rocks" about a central pivot or hinge thereby providing differential response. The diaphragm is designed to respond to pressure gradients, giving it a first order directional response to incident sound.

The inventive microphone diaphragm coupled with a diffraction-based optical sensing scheme provides directional response in a miniature MEMS microphone. This type of device is especially useful for hearing aid applications where it is desirable to reduce external acoustic noise to improve speech intelligibility.

BRIEF DESCRIPTION OF THE DRAWINGS

A complete understanding of the present invention may be obtained by reference to the accompanying drawings, when considered in conjunction with the subsequent detailed description, in which.

DETAILED DESCRIPTION OF THE PREFERRED EMBODIMENT

Generally speaking, the present invention is a directional microphone incorporating a diaphragm, movable in response to sound pressure and an optical sensing mechanism for detecting diaphragm displacement. The diaphragm of the microphone is designed to respond to pressure gradients, giving it a first order directional response to incident sound. This mechanical structure is integrated with a compact optical sensing mechanism that uses optical interferometry to generate an electrical output signal representative of the sound impinging upon the microphone's diaphragm. The novel structure overcomes adverse effects of capacitive sensing of microphones of the prior art.

One of the main objectives of the present invention is to provide a differential microphone suitable for use in a hearing aid and which uses optical sensing in cooperation with a micromachined diaphragm. Of course other applications for sensitive, miniature, directional microphones are within the scope of the invention. Optical sensing provides high electrical sensitivity, which, in combination with high mechanical sensitivity of the microphone membrane, results in a small minimum detectable sound pressure level.

Although optical interferometry has long been used for low noise mechanical measurements, the large size, high voltage and power levels needed for lasers, and the lack of integration have heretofore prohibited the application of optical interferometry to miniature, micromachined microphones. These limitations have recently been overcome by methods and devices as described in U.S. Pat. No. 6,567,572 for OPTICAL DISPLACEMENT SENSOR, issued May 20, 2003 to Degertekin et al. and U.S. patent application Ser. No. 10/704,932, for HIGHLY SENSITIVE DISPLACEMENT MEASURING OPTICAL DEVICE, filed Nov. 10, 2003 by Degertekin et al.

Figure 1A:
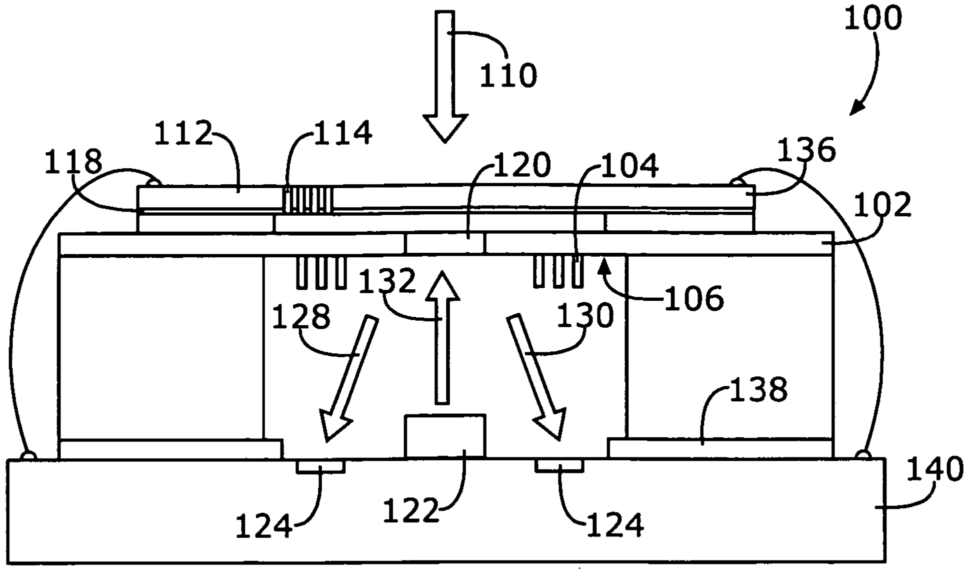
FIGS. 1*a* and 1*b* are schematic, side, sectional and schematic perspective views, respectively, of the optical sensing, differential microphone of the invention.
Figure 1B:
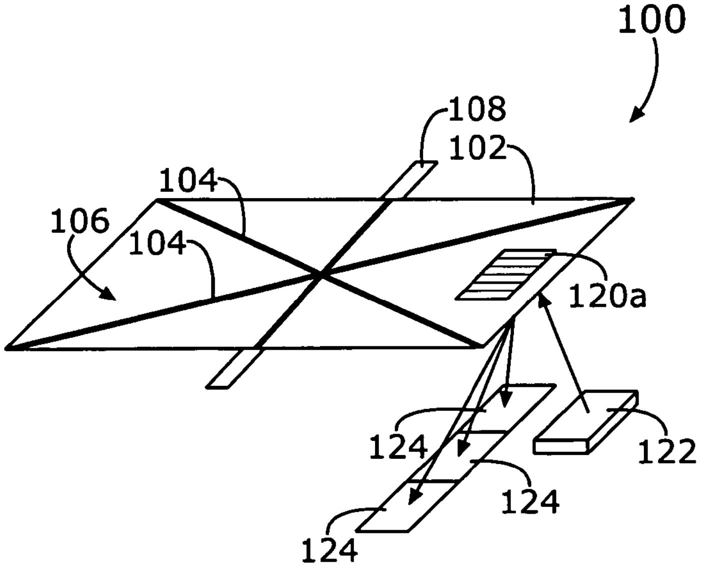
Figure 2A:
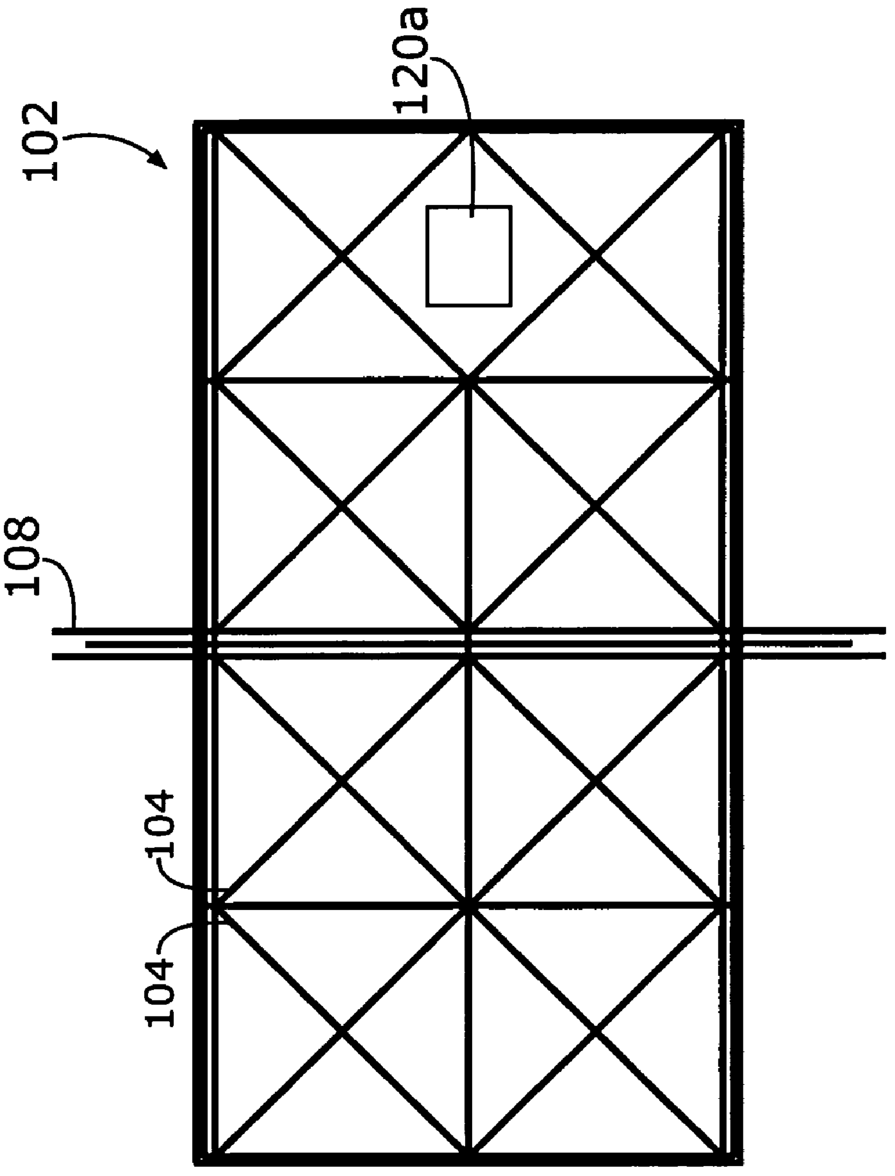
FIGS. 2*a*, 2*b*, and 2*c* are schematic plan views of a diaphragm of the microphone of FIGS. 1*a* and 1*b* incorporating a diffraction apparatus comprising a diffraction grating, inter-digitated fingers, and slits, respectively.

Referring first to FIGS. 1*a* and 1*b*, there are shown schematic, side, cross-sectional and schematic, perspective views, respectively, of a microphone assembly incorporating an optical interferometer in accordance with the present invention, generally at reference number 100. A diaphragm 102 having stiffeners 104 disposed upon a rear surface 106 thereof is free to "rock" (i.e., rotate) about a hinge 108 in response to sound pressure (shown schematically as arrow 110) impinging thereupon. A diffraction mechanism 120 is operatively connected to diaphragm 102. Diffraction mechanism 120 may be implemented in a variety of ways. As shown in FIGS. 1*a* and 1*b*, diffraction mechanism 120 is a diffraction grating 120*a* (FIG. 2*a*), typically disposed centrally in diaphragm 102 close to its edge where deflection is large. A reflective diffraction grating 120*a* having a period of approximately 1 μm has been found suitable for use in the application. It will be recognized, however, that a laser operating at a different wavelength may require a different periodicity in a diffraction grating. The diffraction grating can be curved to implement a diffractive lens to steer and focus the reflected beam to obtain a desired light pattern on the photodetector plane.

Figure 2B:
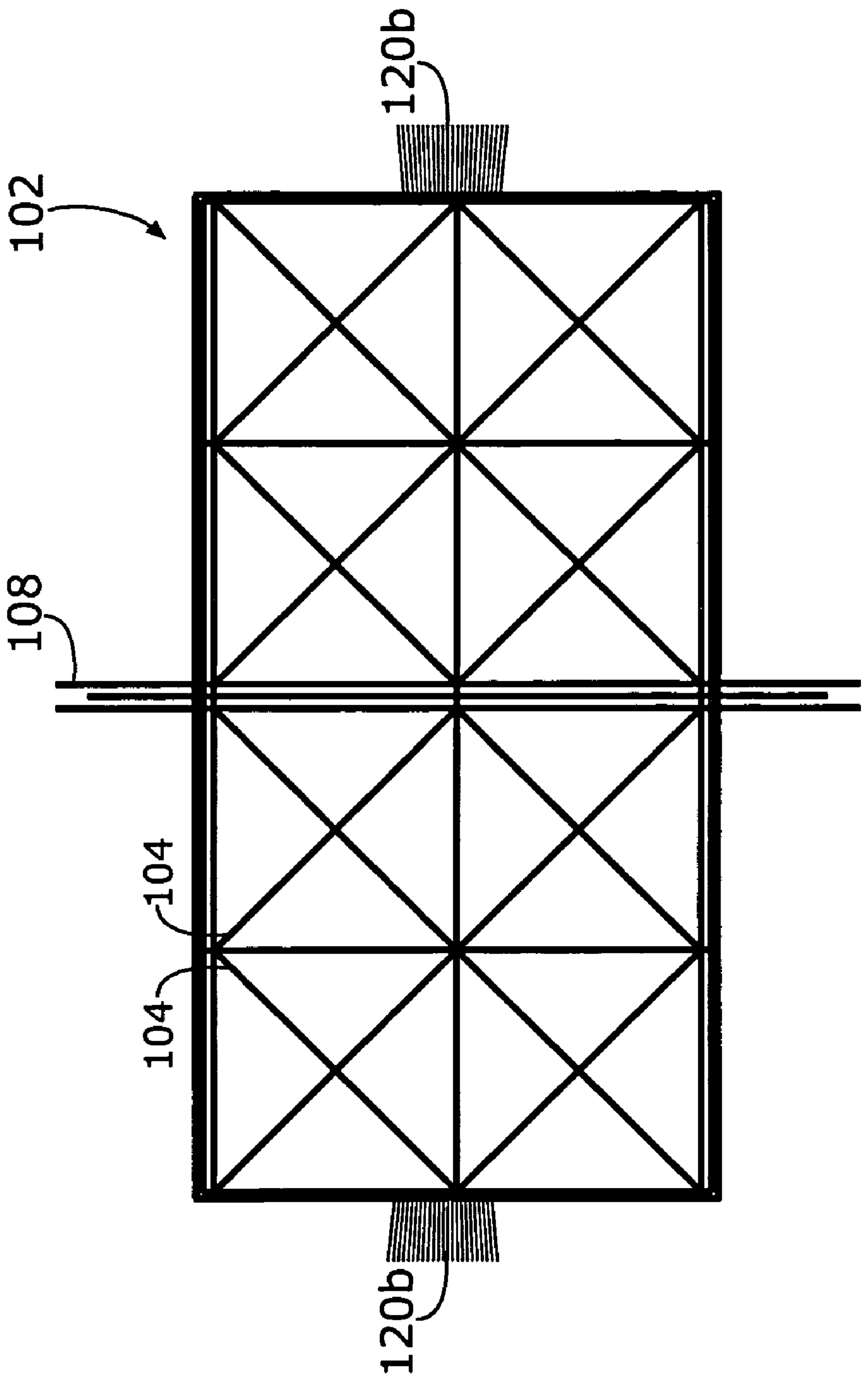
Figure 2C:
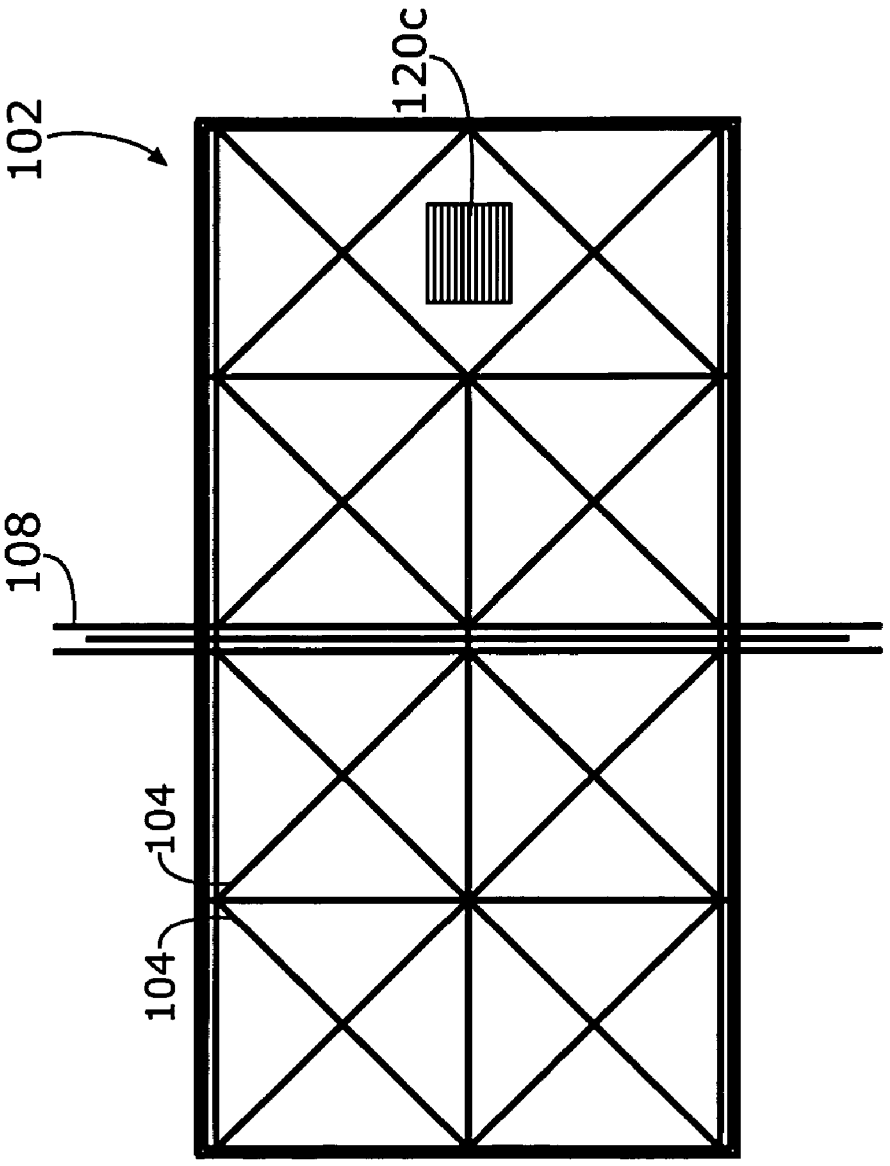

In alternate embodiments, slits 120*c* (FIG. 2*c*) may be disposed in diaphragm 102 to provide the required diffraction function. In still other embodiments, interdigitated fingers 120*b* (FIG. 2*b*) can provide the required diffraction function. An embodiment using interdigitated fingers is described in detail hereinbelow. It will be recognized that other means for implementing diffraction mechanism 120 may exist and the invention is, therefore, not considered limited to the devices chosen used for purposes of disclosure. Rather the invention contemplates any and all suitable diffraction mechanisms. Hereinafter, the term diffraction mechanism is used to refer to any diffraction device suitable for use in practicing the instant invention.

A protective screen 112 is disposed intermediate a sound source 110 and a front face of diaphragm 102. Screen 112 is isolated therefrom by a layer 136, typically formed from silicon dioxide or the like. In the preferred embodiment, protective screen 112 consists of a micromachined silicon plate that contains a plurality of very small holes, slits, or other orifices 114 sized to exclude airborne particulate contamination (e.g., dust) from diaphragm 102 and other interior regions, not shown, of microphone 100. The small holes 114, however, allow the passage of sound pressure 110.

A lower surface of protective screen 112 bears an electrically conductive (typically metallic) layer 118 used to apply a voltage dependent force (i.e., a mechanical bias) to diaphragm 102 as described in detail hereinbelow. The application of a voltage dependent force enables optimizing the position of diaphragm 102 to achieve maximum sensitivity of the optical sensing portion of microphone 100. Conductive layer 118, in addition to helping provide a voltage dependent force, also provides an optically reflective surface that enables the detection of interference fringes between the reflected light from the diffraction mechanism 120 (e.g., optical grating 120*a*, etc.) incorporated on/into diaphragm 102 and screen 112 disposed forward of diaphragm 102. Screen 112 must be as stiff as possible so that the reflective surface of conductive layer 118 is mechanically stable with respect to movements of diaphragm 102. The reflective rear surface of conductive layer 118 forms a fixed mirror portion of the optical interferometer. Screen 112 is integrally attached to diaphragm 102 and manufactured as part of the micromachining process used to form forming microphone 100. The micromachining process is described in detail hereinbelow.

A miniature vertical cavity surface emitting laser (VCSEL) 122 is disposed behind diaphragm 102, typically on or in a bottom chip 140. Bottom chip 140 is typically attached to the remainder of microphone 100 by a bonding layer 138. Coherent light 132 from VCSEL 122 is directed toward diffraction mechanism 120. A Model VCT-F85-A32 VCSEL supplied by Lasermate Corp. operating at a wavelength of approximately 0.85 μm with an aperture of approximately 9 μm has been found suitable for the application. It will be recognized, however, that other similar coherent light sources provided by other vendors may be suitable for the application. Consequently, the invention is not limited to a particular model or operating wavelength but includes any suitable coherent light source operating at any wavelength.

An array of photodetectors 124 is also disposed behind diaphragm 102. In the embodiment chosen for purposes of disclosure, a linear array of three photodetectors 124 appropriately spaced to capture the zeroth and first orders of refracted light as described hereinbelow. In some embodiments, VCSEL 122, can be tilted with respect to the plane of the photodetectors so that the reflected diffraction orders are efficiently captured by the array of photodetectors 124.

In other embodiments, the miniature laser and the array of photodetectors can be formed on the same substrate, such as a gallium arsenide semiconductor material.

The components shown schematically in FIG. 1 implement a Michelson interferometer complete in a small volume. Such a compact arrangement including a low power laser and detection electronics is suitable for use in hearing aids and other miniature devices requiring a microphone.

The diffraction grating 120*a* or other diffraction apparatus 120 on the microphone diaphragm 102 and the reflective surface of metallic coating 118 on the protective screen 112 together form a phase-sensitive diffraction grating. Such structures are used to detect displacements as small as 2×10-4 Å/√Hz in atomic force microscope (AFM), micromachined accelerometer, and acoustic transducer applications.

When the structure of FIG. 1 is illuminated from the back side using coherent light source 122, light reflects both from the diffraction mechanism 120 (e.g., diffraction grating 120*a*) that is integrated into diaphragm 102 and from coating 118 of protective screen 112, reference numbers 128, 130, respectively. While reflected light 128, 130 is shown schematically as rays, it will be recognized that the reflected diffraction orders have a beam shape of finite effective size determined by the light distribution at the laser source, the shape and curvature of the diffraction mechanism 120, and the distance traveled by the light 128, 130. In the ideal case of a linear grating with 50% fill factor, i.e. equal amount of light reflection from the diffraction mechanism and the coating of the protective screen the reflected light 128, 130 has odd diffraction orders in addition to the normal specular reflection.

In an alternate embodiment of the inventive microphone, interdigitated fingers 120*b* (FIG. 2*b*) bearing reflective rear surfaces may be used to form both the fixed and movable mirrors necessary to form the optical interferometer. The use of the fixed interdigitated fingers as the stationary mirror allows the elimination of a reflective surface on screen 112. Reflective rear surfaces on the movable fingers form the movable mirror. Interdigitated fingers are described in detail in copending U.S. patent application Ser. No. 11/198,370. Interdigitated fingers 120*b* are typically disposed at the end of diaphragm 102 to maximize the relative motion of the fingers relative to associated fixed fingers. It will be recognized, however, that the interdigitated fingers may be disposed at other locations around the perimeter of diaphragm 102. It will also be recognized that multiple, independent sets of interdigitated fingers, each associated with its own optical pickup system, may be used to differentially sense an electrical signal from diaphragm 102 of microphone 100. It may be desirable under certain operating conditions to use such a differential arrangement to overcome outputs caused by in-phase motion of the diaphragm 102.

In embodiments utilizing interdigitated fingers, fingers of approximately 100 μm length and 1 μm width having approximately 4 μm periodicity have been found suitable for the application. While the aforementioned dimensions have been determined by detailed finite element analysis, other interdigitated geometries, of course, may be used. Interdigitated fingers may be disposed at one or both ends of diaphragm 102 where deflection thereof is greatest. In alternate embodiments, one or more groups of interdigitated fingers may be disposed at any position on the perimeter of diaphragm 102.

Figure 3A:
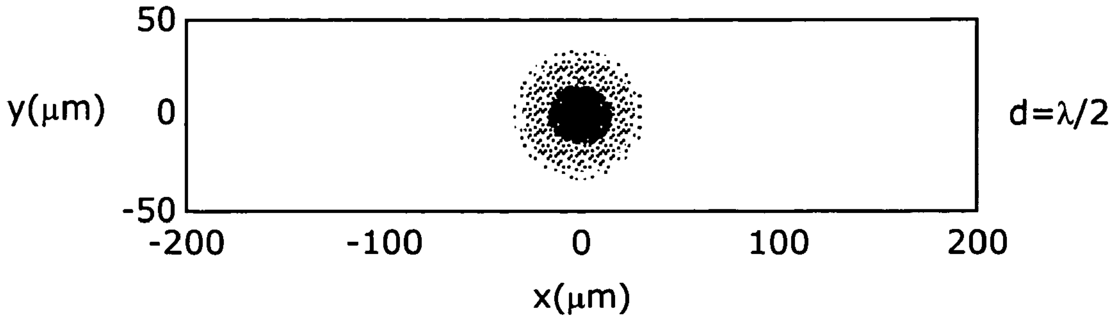
FIGS. 3*a*, 3*b* and 3*c* are calculated reflected diffraction patterns using scalar far-field diffraction formulation for gap values of $\lambda/2$, $\lambda/4$, and $\lambda/8$, respectively.
Figure 3B:
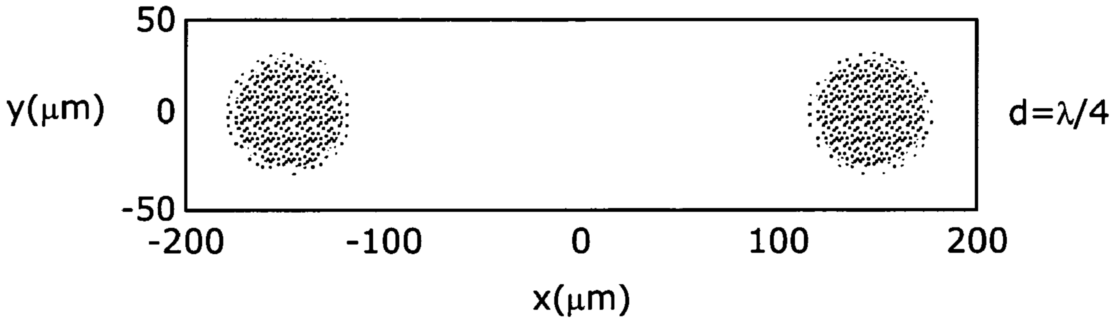
Figure 3C:
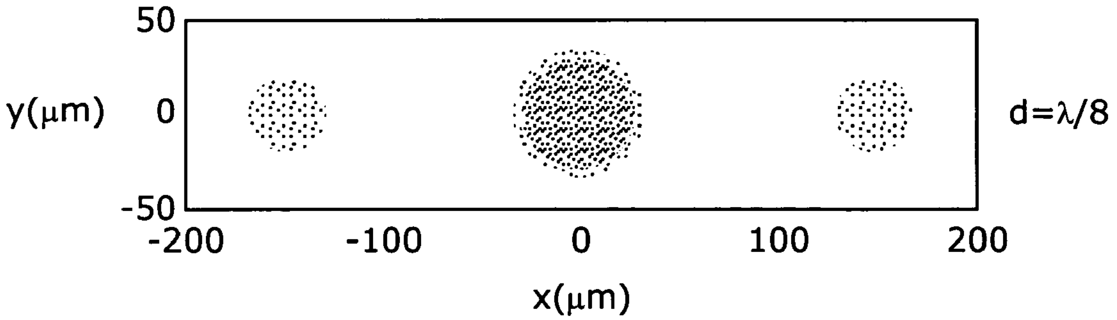

Referring now to FIGS. 3*a*, 3*b*, and 3*c*, there are shown calculated reflected diffraction patterns for various gap values at the surface of the silicon wafer, which carries the photodetectors and associated CMOS electronics, not shown. FIGS. 3*a*, 3*b*, and 3*c* represent gap spacing of λ/2, λ/4, and λ/8, respectively. These calculations are performed using scalar diffraction theory with 1 μm periodicity.

Optical output signals can be converted to electrical signals by placing three 100 μm by 100 μm silicon photodetectors at x=0, and x=±150 μm to capture the zero and first orders. The intensities, $I_0$ and $I_1$ can be expressed as a function of the gap thickness, $d_0$ 128 (FIG. 1), between the microphone diaphragm 102 and the protective screen 112 (FIG. 1) and may be computed as:

$$I_0 = I_{in}\cos\left(\frac{2\Pi d_0}{\lambda_0}\right) \quad (4a, 4b)$$

$$I_1 = \frac{4I_{in}}{\Pi^2}\sin^2\left(\frac{2\Pi d_0}{\lambda_0}\right)$$

Figure 4:
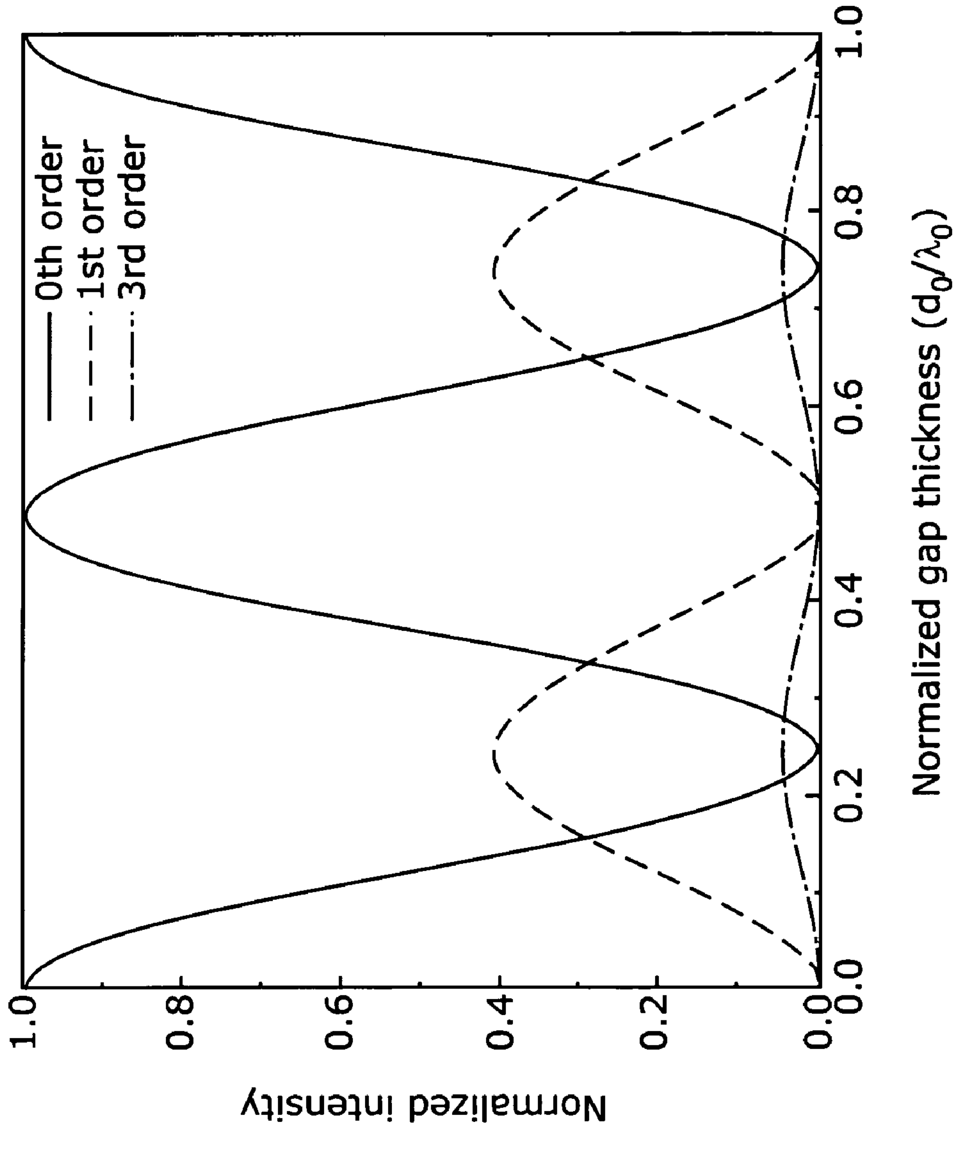
FIG. 4 is a plot of normalized intensity vs. gap for the microphone of FIG. 1.

As may be seen in FIG. 4, the maximum displacement sensitivity is obtained when $d_0$ is biased to an odd multiple of $\lambda_0/8$. It can be shown that for small displacements, Δx, around this bias value, the difference in the output currents of the photodetectors detecting these orders, i is given by the equation:

$$i = R\frac{\partial(I_0 - \alpha I_1)}{\partial d_0}\Delta x = RI_{in}\frac{4\Pi}{\lambda_0}\Delta x \quad (5)$$

where $I_{in}$ is the incident laser intensity and R is the photodetector responsivity. It may be concluded, therefore, that the inventive structure provides the sensitivity of a Michelson interferometer for small displacements of the microphone diaphragm with the following advantages:

- The bulky beam splitter typically required in a Michelson interferometer is eliminated enabling construction of a miniature interferometer.
- Both the reference reflector and moving reflector (grating) are on the same substrate, thereby minimizing spurious mechanical noise.
- The small distance between the grating 120 and the protective screen 112 (≈5 μm) enables the use of low power, low voltage VCSELs with short (i.e., 100-150 μm) coherence length as light sources for the interferometer.
- The novel interferometer construction enables integration of photodetectors and electronics in small volumes (i.e., ≈1 $mm^3$).

Since the curves in FIG. 4 are periodic, it will be recognized that the microphone diaphragm 102 (FIG. 1) need only be moved λ/4 to maximize the microphone sensitivity. In some embodiments where the grating period is comparable to the wavelength $\lambda_0$, a more accurate calculation of the diffraction patterns should be performed taking the vectorial nature of the light propagation into account. As shown in the reference by W. Lee and F. L. Degertekin, "Rigorous Coupled-wave Analysis of Multilayered Grating Structures," *IEEE Journal of Lightwave Technology,* 22, pp. 2359-63, 2004, the diffraction order intensity variation with the gap thickness, $d_0$ 128 can be different than the simple relation in Equation 4. However, since the sensitivity variation has its maxima and minima with close to $\lambda_0/2$ periodicity, to obtain maximum sensitivity the microphone diaphragm 102 needs only to be moved less than $\lambda_0/2$ to maximize the microphone sensitivity. In the novel microphone design, a bias voltage in the range of approximately 1-2 V applied between the membrane (i.e., diaphragm 102) and the protective screen 112 is sufficient to accomplish displacements of this magnitude. The selective application of such a bias voltage, therefore, overcomes process variations. During microphone fabrication, applying bias voltages suitable for hearing aids or other intended applications results in a robust design.

The use of a miniature laser is important when implementing the optical sensing method of the invention. The recent availability of VCSELs, for example, is helpful in creating a practical differential microphone using optical sensing. These efficient micro-scale lasers have become available due to recent developments in opto-electronics and optical communications. VCSELs are ideal for low voltage, low power applications because they can be switched on and off, typically using 1-2V pulses with threshold currents in the 1 mA range to reduce average power. VCSELs having threshold currents below 400 μA are available. The noise performance of VCSELs has also been improving rapidly. This improvement helps make them suitable for sensor applications where high dynamic ranges (e.g., in the 120-130 dBs) are desirable. Furthermore, using the differential detection scheme (between $I_0$ and $I_{\pm1}$ in Equation (5)), the intensity noise is reduced to negligible levels.

One important concern with optical detection methods is power consumption. Given the mechanical sensitivity of the microphone diaphragm 102 in m/Pa, the minimum detectable displacement (MDD) determines the power consumption. As an example, for a typical differential microphone diaphragm suitable for use in the optical sensing microphone of the invention, having a mechanical sensitivity of 10 nm/Pa, an input sound pressure referred noise floor of 15 dBA SPL requires an MDD of $1\times10^{-4}$ Å/√MHz. To predict the power consumption required for this MDD, a noise analysis of the photodetector-amplifier system has been performed based on an 850 nm VCSEL as the light source and responsivity of the photodetector, R=0.5 A/W.

Figure 5:
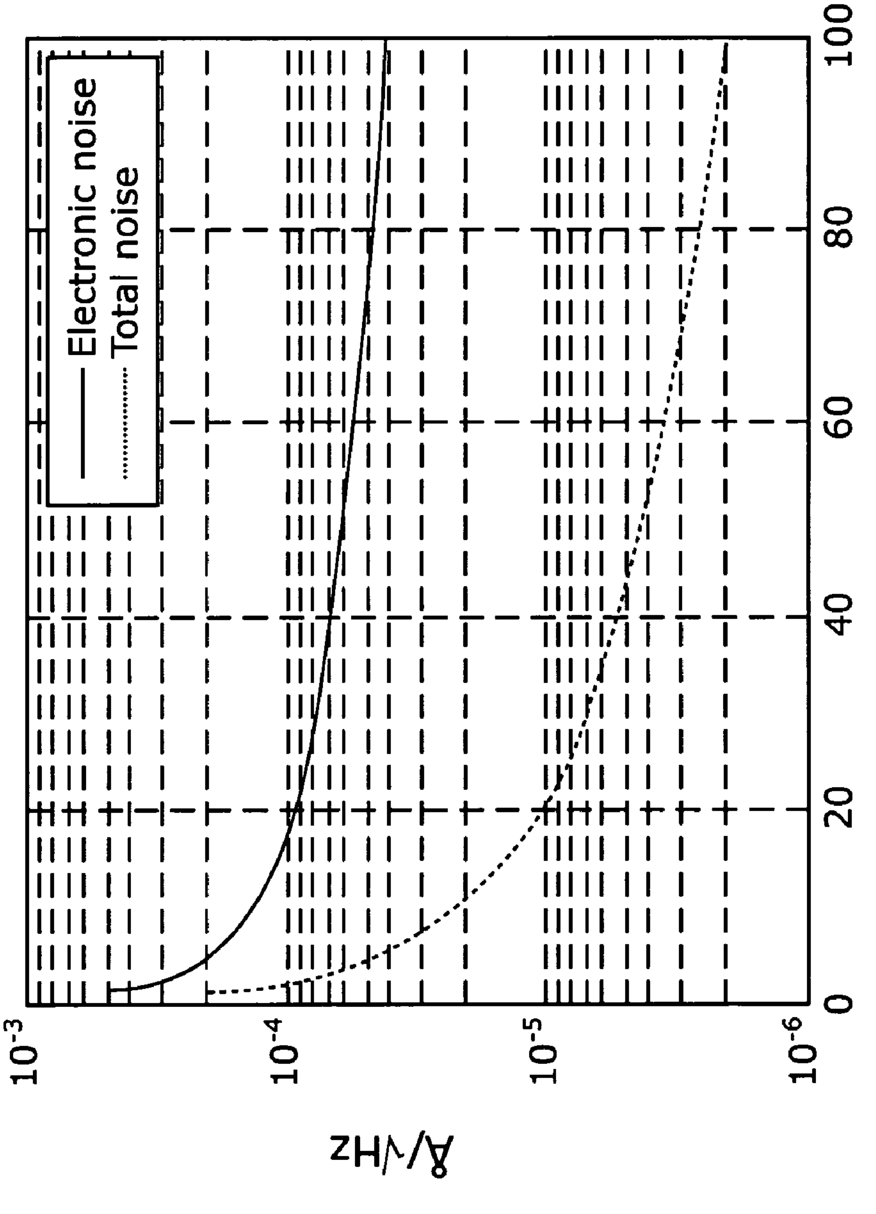
FIG. 5 is a plot of calculated minimum detectable displacement of the diaphragm of the microphone of FIG. 1 as a function of total optical power incident on the photodetectors.

A transimpedance configuration formed using a commercially available micro power amplifier (Analog Devices OP193, 1.7V, 25, uW, $e_n$=65 nV/VHz, in=0.05 pA/√Hz) was analyzed. Transimpedance amplifier topologies are known to those of skill in the art and are not further disclosed herein. FIG. 5 shows the MDD as a function of the average laser power with a 1 MΩ feedback resistor. Due to the high electrical sensitivity of the optical sensing technique, the displacement noise is dominated by the shot noise. Hence, custom designed CMOS amplifiers with a 1V supply voltage and 5 μW power consumption may be used without affecting the photodiode-dominated noise floor. Then, the power consumption of the microphone can be estimated from the laser power required for a given displacement noise from the shot noise relation:

$$\sqrt{2q\frac{I_{peak}}{2}R} = \frac{4\Pi}{\sqrt{2}}\frac{\lambda}{4\Pi}I_{peak}R\frac{x_n}{\lambda} \Rightarrow x_n = \sqrt{\frac{2q}{I_{peak}R}} \tag{6}$$

The results show that the average laser power required for $1\times10^{-4}$ Å/√MHz, is an MDD of approximately 20 μW. Similar values (e.g., $5.5\times10^{-4}$ Å/√MHz with 3 μW optical power) have already been achieved in some AFM applications. This average power may be achieved using the VCSEL in the pulsed mode as described in copending U.S. patent application Ser. No. 11/297,097 filed by Degertekin et al. on Dec. 8, 2005 for "Displacement Sensor". Assuming 30% wall plug efficiency for the VCSEL, 20 μW optical power can be obtained with about 80 μW input power including optical losses. See http://www.ulm-photonics.de. Therefore, it is possible to achieve a 15 dBA noise floor using an optical sensing technique with total power consumption of less than 100 μW, including associated electronics, which is comparable to the power consumption of a directional hearing aid with two electret microphones (for example, a Knowles electronics model EM series). Furthermore, the development of more efficient VCSELs in the pulse-modulation mode is expected to help reduce both the power consumption and to improve of low-frequency amplifier noise.

Implementation of the photodetectors 124 with integrated amplifiers in CMOS technology is facilitated by the fact that the proposed optical sensing scheme does not impose strict design requirements with the exception of the low power consumption.

Referring now to FIGS. 6*a*-6*d*, there is shown the fabrication process flow for the microphone diaphragm 102. Many ways may be found to fabricate the microphone of the present invention. The following exemplary method has been successfully utilized to fabricate the diaphragm 102 membrane and diffraction mechanism 120. The micromachining fabrication technique uses deep-trench etching and sidewall deposition to create very lightweight, very stiff membranes with stiffening ribs at optimal locations.

Figure 6A:
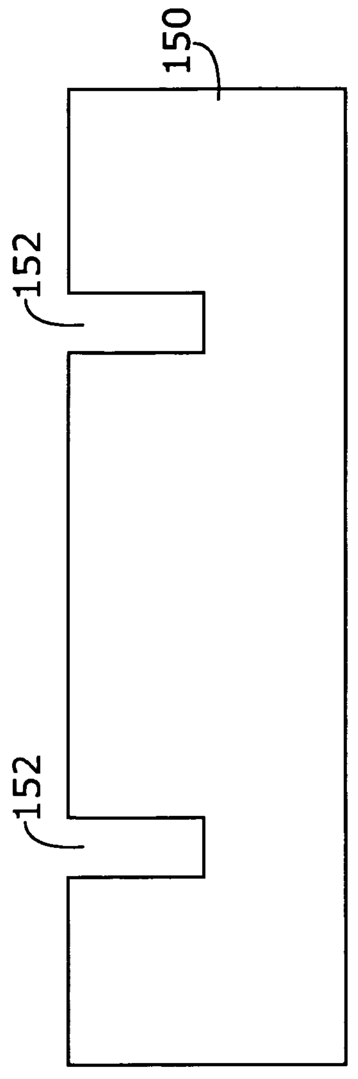
FIGS. 6*a*-6*d* are a fabrication process flow showing a set of possible fabrication steps useful for forming the microphone of FIGS. 1*a* and 1*b;*

As shown in FIG. 6*a*, the fabrication starts with a deep reactive ion trench etch into the 4-inch test grade silicon wafer 150 forming trenches 152 that act as the molds for the polysilicon stiffeners 104 (FIGS. 1*a*, 1*b*).

Figure 6B:
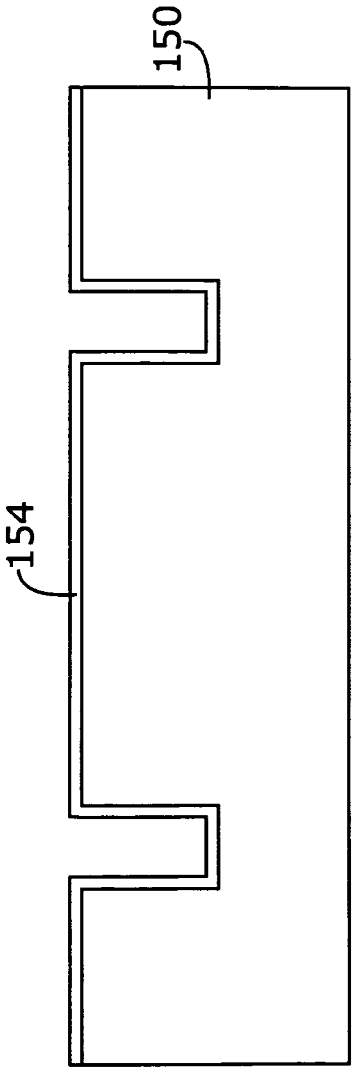
Figure 6C:
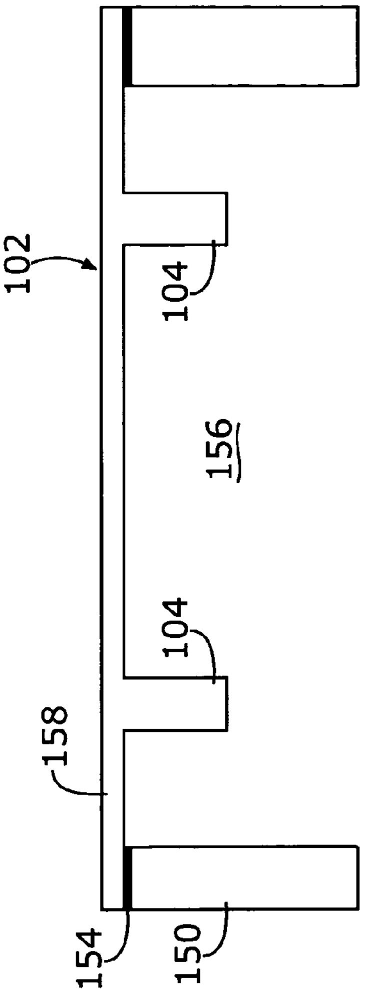
Figure 6D:
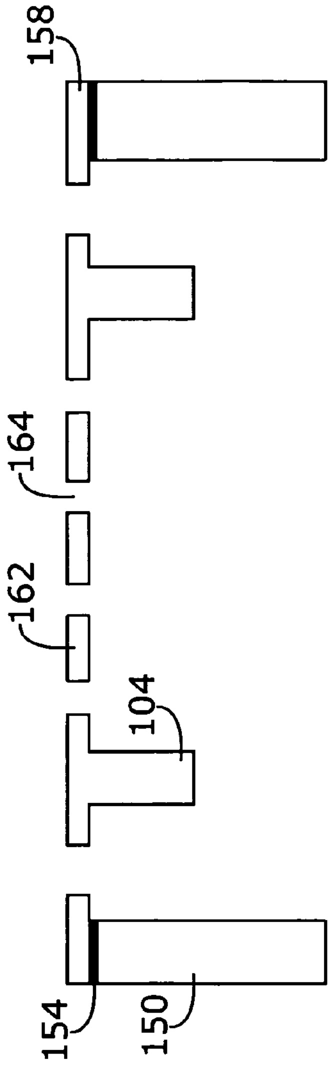

The etching process is followed by a wet oxidation at approximately 1100° C. to grow an approximately one-micron thick thermal oxide layer 154 on the wafer 150 surface and in the trenches 152 as shown in FIG. 6*b*.

As seen in FIG. 6*b*, oxide layer 154 acts as an etch stop for a subsequent back side cavity etching step that removes the bulk of the silicon wafer 150 from the region 156 behind what will be the diaphragm. A film of polysilicon 158 is next deposited and planerized to form a flat diaphragm surface 102 having stiffeners 104 formed on a rear surface thereof. Typically phosphorus-doped polysilicon is deposited at approximately 580° C. and subsequently annealed at 1100° C. in argon gas for approximately 60 minutes. The annealing step reduces intrinsic stress in the film 158.

The back cavity region 156 is then etched using a deep reactive ion etch and the thermal oxide layer 154 is removed in buffered oxide etch (BOE). The final step is to etch the polysilicon 158 to define the interdigitated fingers 162 and slits 164 that separate the diaphragm 102 from the substrate 150.

Figure 7A:
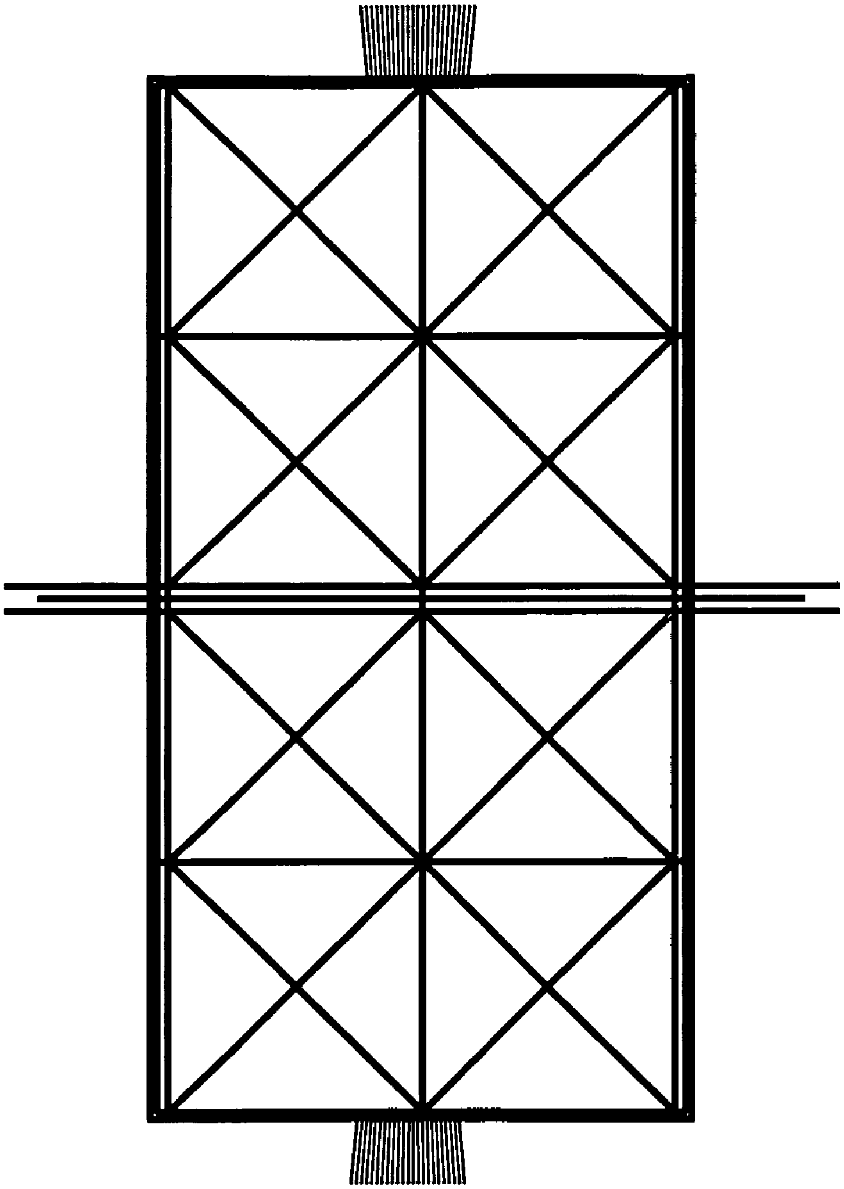
FIGS. 7*a* and 7*b* are a front side optical and a rear side SEM view of the diaphragm of the microphone of FIGS. 1*a* and 1*b*.
Figure 7B:
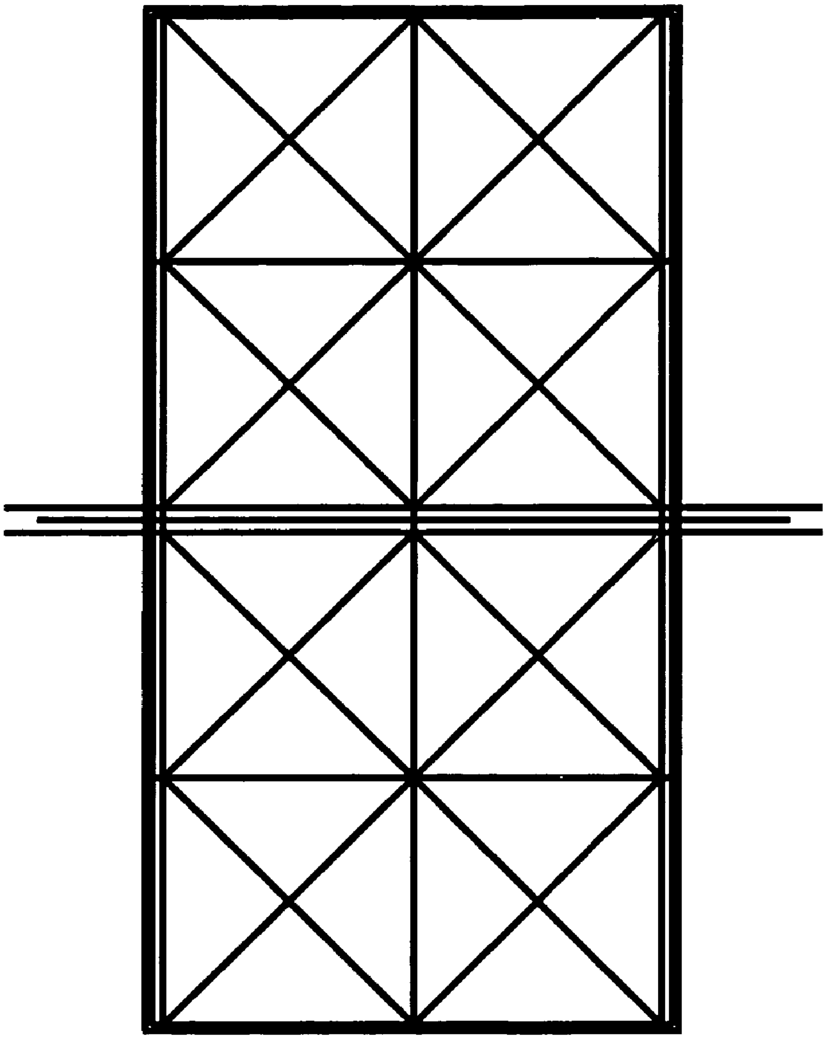

Referring now also to FIGS. 7*a* and 7*b*, there are shown front-side optical and back side schematic views, respectively, of the microphone diaphragm and interdigitated fingers formed in accordance with the forgoing fabrication process. FIG. 7*a* shows the front surface 160. The interdigitated fingers and slits 162, 164 on each end of the diaphragm 102 extend into the polysilicon layer connected to the silicon substrate 150.

The microphone diaphragm 102 is separated from the substrate with an approximately 2 μm gap around the edge and the center hinges for acoustical damping and electrical isolation.

Figure 7C:
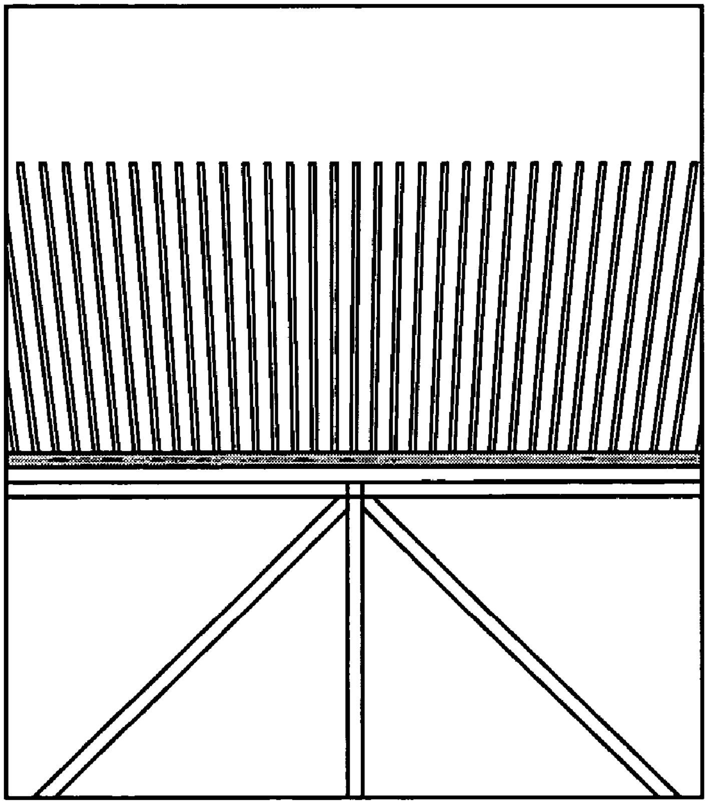
FIG. 7*c* is an enlarged, backlit view of interdigitated fingers on the diaphragm of FIGS. 7*a* and 7*b*.

The details of the interdigitated fingers can be seen in FIG. 7*c* that also shows the stiffeners 104 on the diaphragm 102 as dark lines on the left, whereas the stationary fingers 162 extend from the polysilicon layer attached to the substrate on the right.

It will be recognized that other fabrication processes and/or materials may be used to form structures similar to that described herein. The invention, therefore, is not limited to the fabrication steps and/or material chosen for purposes of disclosure. Rather, the invention contemplates any and all fabrication processes and materials suitable for forming a microphone as described herein.

REFERENCES

Hall N. and Degertekin F. L., *An Integrated Optical Detection Method for Capacitive Micromachined Ultrasonic Transducers*, Proceedings of 2000 IEEE Ultrasonics Symposium, pp. 951-954, 2000.

Hall N. A. and Degertekin F. L., *An Integrated Optical Interferometric Detection Method for Micromachined Capacitive Acoustic Transducers*, Appl. Phys. Lett., 80, pp. 3859-6.

W. Lee and F. L. Degertekin, *Rigorous Coupled-wave Analysis of Multilayered Grating Structures, IEEE Journal of Lightwave Technology,* 22, pp. 2359-63, 2004

W. Cui, B. Bicen, N. Hall, S. A. Jones, F. L. Degertekin, and R. N. Miles *Proceedings of* $19^{th}$ *IEEE International Conference on Micro Electro Mechanical Systems* (*MEMS* 2006), Jan. 22-26, 2006, Istanbul, Turkey. Optical sensing in a directional MEMS microphone inspired by the ears of the parasitoid fly, *Ormia ochracea*

Since other modifications and changes varied to fit particular operating requirements and environments will be apparent to those skilled in the art, this invention is not considered limited to the example chosen for purposes of this disclosure, and covers all changes and modifications which does not constitute departures from the true spirit and scope of this invention.

Having thus described the invention, what is desired to be protected by Letters Patent is presented in the subsequently appended claims.

What is claimed is:

1. A directional microphone, comprising:

a) a substrate having a differential, MEMS microphone diaphragm supported thereon for deflection about a central pivot axis thereof with respect to the substrate and an at least partially optically reflective portion under a stationary protective cover, the diaphragm having a free edge, an optically diffractive portion, and being pivotally responsive to an acoustically-induced pressure gradient across the central pivot axis;

b) a light source disposed in operative relationship with said diaphragm to illuminate at least the optically diffractive portion;

c) a detector adapted to detect an interferometric modulation of light from the light source by a pivotal movement of the optically diffractive portion with respect to the at least partially optically reflective portion; and d) photodetection electronics operatively connected to the detector, adapted to generate an electrical signal representative of the acoustic wave.

2. The directional microphone in accordance with claim 1, wherein said light source comprises at least one vertical cavity surface emitting laser (VCSEL).

3. The directional microphone in accordance with claim 2, wherein the optically diffractive portion comprises an optical diffraction grating formed on the diaphragm.

4. The directional microphone in accordance with claim 1, wherein detector comprises a semiconductor photodetector.

5. The directional microphone in accordance with claim 4, wherein said photodetection electronics comprises a transimpedance amplifier.

6. The directional microphone in accordance with claim 1, wherein said diaphragm comprises an upper major surface and a lower major surface, and wherein said microphone further comprises a protective screen disposed over said upper major surface of said diaphragm.

7. The directional microphone in accordance with claim 6, wherein said diffractive portion is disposed on said lower major surface of said diaphragm.

8. The directional microphone in accordance with claim 6, wherein said protective screen comprises a micromachined silicon plate having a plurality of slits therein.

9. The directional microphone in accordance with claim 1, wherein said microphone diaphragm is fabricated from a silicon wafer by plasma enhanced chemical vapor deposition, separated from an overlying screen by a silicon oxide layer.

10. The directional microphone in accordance with claim 1, wherein the MEMS microphone diaphragm comprises an optical grating; the at least partially optically reflective portion comprises a screen over the MEMS microphone diaphragm, formed integrally with the MEMS microphone diaphragm with an intervening oxide layer, and the detector comprises an optical interferometric motion detector.

11. The directional microphone in accordance with claim 1, wherein said optically diffractive portion, and said at least partially optically reflective portion each comprise a plurality of inter-digitated fingers.

12. The directional microphone in accordance with claim 1, wherein said light source comprises a laser having an approximately 0.85 μm wavelength and a coherence length of less than about 150 μm, and wherein the optically diffractive portion and the at least partially optically reflective portion are separated along an axis of light propagation by less than or equal to about 5 μm.

13. The directional microphone in accordance with claim 12, wherein said light source comprises at least one vertical cavity surface emitting laser (VCSEL).

14. The directional microphone in accordance with claim 12, wherein the light source is pulse modulated.

15. The directional microphone in accordance with claim 14, wherein the detector comprises a photodetector integrated with a CMOS amplifier.

16. The directional microphone in accordance with claim 1, wherein said diaphragm is supported on said substrate with at least two pivots.

17. The directional microphone in accordance with claim 1, forming part of a hearing aid.

18. The directional microphone in accordance with claim 17, wherein the light source and the detector have a power dissipation during operation of less than about 100 μW.

19. The directional microphone in accordance with claim 1, wherein a predetermined average separation between the optically diffractive portion and the at least partially optically reflective portion is electrostatically maintained.

20. The directional microphone in accordance with claim 19, wherein the predetermined average separation is less than or equal to about 5 μm and at least a portion of the diaphragm and at least a portion of a screen supporting the at least partially optically reflective portion are controlled to have respectively different electrostatic potential.

21. A method of detecting sound, comprising:

a) providing a substrate having a differential, MEMS microphone diaphragm supported thereon by a pivot and having a diffractive portion and a free edge for free pivotal movement with respect to the substrate in response to acoustic waves having a directionally sensitive response pattern, and a reflective portion fixed in relation to the substrate and spaced approximately equal to or less than 5 μm from a resting position of the pivotally moving diaphragm along an optic axis, wherein the resting position of the diaphragm is actively controlled;

b) illuminating at least the diffractive portion which moves in conjunction with the diaphragm and the reflective portion fixed in relation to the substrate with a coherent light source along the optic axis;

c) detecting light from the light source which is modulated by a movement of the diaphragm with respect to the reflecting portion, substantially without a beamsplitter in an optical path of the light from the light source to an optical detector; and d) generating an electrical signal representative of the acoustic wave based on the modulated light.

22. A micromachined directional microphone, comprising:

a substrate defining a microphone back side cavity;

a diaphragm having a free edge, suspended over the back side cavity by a pair of centrally located pivots, the pair of pivots being adapted to permit diaphragm deflection about a pivot axis in response to an acoustic pressure gradient across the pivot axis;

a diffractive structure which moves in unison with the diaphragm;

a reflective structure having a fixed position with respect to the substrate, disposed over a front side of the diaphragm;

a light source adapted to illuminate the diffractive structure and the reflective structure from within the back side cavity to produce an interference pattern dependent on a distance along an optical axis therebetween;

a light detector, located within the back side cavity, adapted to detect the interference pattern and produce an electrical signal in response thereto; and an output, presenting an electrical signal corresponding to the acoustic pressure gradient across the pivot axis.

* * * * *